US012798410B2

(12) United States Patent
Kim et al.

(10) Patent No.: US 12,798,410 B2
(45) Date of Patent: Nov. 17, 2026

(54) SUPER CAPACITOR CHANGING SYSTEM AND METHOD OF PERFORMING THE SAME

(71) Applicant: SEOYON E-HWA CO., LTD., Anyang (KR)

(72) Inventors: Sung Jin Kim, Sejong (KR); Tae Gyung Kim, Seongnam (KR)

(73) Assignee: SEOYON E-HWA CO., LTD., Anyang (KR)

( * ) Notice: Subject to any disclaimer, the term of this patent is extended or adjusted under 35 U.S.C. 154(b) by 621 days.

(21) Appl. No.: 18/498,043

(22) Filed: Oct. 31, 2023

(65) Prior Publication Data

US 2024/0140223 A1 May 2, 2024

(30) Foreign Application Priority Data

Oct. 31, 2022 (KR) ........................ 10-2022-0142207

(51) Int. Cl.

*B60L 53/80* (2019.01)
*B60L 53/16* (2019.01)
*B60L 53/66* (2019.01)
*H02J 7/34* (2006.01)

(52) U.S. Cl.

CPC ............... *B60L 53/16* (2019.02); *B60L 53/66* (2019.02); *H02J 7/345* (2013.01)

(58) Field of Classification Search

CPC .......... B60L 53/16; B60L 53/66; B60L 58/10; B60L 50/40; B60L 53/80; H02J 7/345; Y02T 10/70

See application file for complete search history.

(56) References Cited

FOREIGN PATENT DOCUMENTS

| | | | | | |
|---|---|---|---|---|---|
| CN | 102802982 | A | | 11/2012 | |
| CN | 107487197 | A | * | 12/2017 | .............. B60L 53/60 |
| CN | 107791850 | A | * | 3/2018 | .............. B60L 15/00 |
| CN | 114616123 | A | | 6/2022 | |
| DE | 102014226372 | A1 | | 6/2016 | |
| EP | 3 760 470 | A1 | | 1/2021 | |

(Continued)

OTHER PUBLICATIONS

Office Action From German Patent Office Dated Nov. 26, 2025 Issued for German Patent Application No. 10 2023 130 138.1.

*Primary Examiner* — Jamara A Franklin
(74) *Attorney, Agent, or Firm* — Harvest IP Law, LLP

(57) ABSTRACT

A method of changing a super capacitor for a vehicle according to the present invention includes, when the vehicle arrives at a supercap changing station when a supercap system is to be changed, coupling a vehicle mounting part of the supercap system to the vehicle and fastening a coupling state detection connector; measuring, by the supercap system, a contact resistance of the coupling state detection connector and providing the measured contact resistance to the vehicle; when the vehicle receives the contact resistance of the coupling state detection connector from the supercap system, comparing the contact resistance of the coupling state detection connector with a preset threshold resistance range; generating, by the vehicle, a control signal according to the comparison result and providing the generated control signal to the supercap changing station; and coupling, by the supercap changing station, the vehicle and the supercap system according to the control signal.

7 Claims, 5 Drawing Sheets

(56) References Cited

FOREIGN PATENT DOCUMENTS

| | | | | | |
|---|---|---|---|---|---|
| JP | 2018182915 | A | | 11/2018 | |
| KR | 10-1998-0059246 | A | | 10/1998 | |
| KR | 20120114490 | A | | 10/2012 | |
| KR | 101261570 | B1 | * | 5/2013 | ............. B60L 53/00 |
| KR | 20220115655 | A | | 8/2022 | |

* cited by examiner

SUPER CAPACITOR CHANGING SYSTEM AND METHOD OF PERFORMING THE SAME

BACKGROUND

1. Field of the Invention

The present invention relates to a super capacitor changing system for a vehicle and a method of performing the same, and more particularly, to a super capacitor changing system for a vehicle through which a fastening state of a coupling state detection connector applied to a changeable supercap system can be checked and managed to detect and check whether the coupling state detection connector is fastened when a changing operation is performed, which allows the supercap system to be assembled normally in a vehicle, and a method of performing the same.

2. Discussion of Related Art

Generally, when a vehicle battery is fully discharged, the vehicle battery is supplied with electricity from another vehicle or a new battery using a jump cable to start the discharged vehicle battery and drive a generator, thereby charging the battery.

The vehicle battery is charged by a generator (alternator) connected to a vehicle engine and supplies power to drive a starting motor that starts the vehicle. However, when the vehicle battery is not charged with electricity, the vehicle engine is not driven, and when the engine is not driven, the generator may not be driven, and the battery is not recharged.

When the battery is discharged, the battery is supplied with electricity from another vehicle or a new battery using the jump cable to start the vehicle and drive the generator, thereby charging the battery.

In addition, currently, among products of automobile insurance companies in Korea, an emergency roadside service may help overcome the above difficulties. However, this is frustrating for modern people who value their time.

In general, super capacitors are receiving much attention as next-generation energy storage devices, and research is being conducted on practical use and commercialization of systems using super capacitors as main or auxiliary energy storage devices.

In the case of electric vehicle systems that use supercaps as auxiliary energy storage devices among the many application fields of supercaps, supercaps are responsible for instantaneous energy supply and demand, which is evaluated as a very reasonable way to extend the life of a battery and increase the efficiency of an electric energy system.

However, a high-voltage coupling state detection connector and a low-voltage coupling state detection connector for communication for supplying energy to vehicles should have no problems with a coupling and connection state for smooth charging, discharging and communication of a supercap system.

In addition, unlike the existing coupling state detection connector coupling structure, the coupling state detection connector applied to the changeable supercap system cannot apply a separate locking structure, and thus may have problems such as poor fastening state and poor terminal contact during the coupling process, and a separate locking structure cannot be applied.

SUMMARY OF THE INVENTION

The present invention provides a super capacitor changing system for a vehicle with which problems due to poor contact, communication errors, and the like due to poor fastening of a coupling state detection connector when changing a supercap system can be prevented, and a method of performing the same.

In addition, the present invention provides a super capacitor changing system for a vehicle through which a fastening state of a coupling state detection connector applied to a changeable supercap system can be checked and managed to detect and check whether the coupling state detection connector is fastened when a changing operation is performed, which allows the supercap system to be assembled normally in a vehicle, and a method of performing the same.

Objects of the present invention are not limited to the above-described objects, and other objects and advantages of the present invention that are not described may be understood from the following description and will be more clearly appreciated from exemplary embodiments of the present invention. In addition, it may be easily appreciated that objects and advantages of the present disclosure may be realized by means mentioned in the claims and combinations thereof.

According to an embodiment of the present invention, a method of changing a super capacitor for a vehicle includes: when the vehicle arrives at a supercap changing station when a supercap system is to be changed, coupling a vehicle mounting part of the supercap system to the vehicle and fastening a coupling state detection connector; measuring, by the supercap system, a contact resistance of the coupling state detection connector and providing the measured contact resistance to the vehicle; when the vehicle receives the contact resistance of the coupling state detection connector from the supercap system, comparing the contact resistance of the coupling state detection connector with a preset threshold resistance range; generating, by the vehicle, a control signal according to the comparison result and providing the generated control signal to the supercap changing station; and coupling, by the supercap changing station, the vehicle and the supercap system according to the control signal.

The generating, by the vehicle, of the control signal according to the comparison result and providing the generated control signal to the supercap changing may include generating a first control signal for instructing the coupling of the vehicle and the supercap system when the contact resistance of the coupling state detection connector is within a preset threshold resistance range.

The method may further include, when the contact resistance of the coupling state detection connector is not within the preset threshold resistance range after the vehicle is released, generating a second control signal for instructing the supercap changing station to disconnect the vehicle and the supercap changing system and providing the generated second control signal to the supercap changing station.

According to another embodiment of the present invention, a super capacitor changing system for a vehicle may include: a supercap system that, when the vehicle arrives at a supercap changing station when a supercap system is to be changed, is coupled to the vehicle and provides a contact resistance of the coupling state detection connector when a coupling state detection connector is fastened; a supercap changing station that couples the vehicle and the supercap system upon receiving a control signal; and a vehicle that, when receiving the contact resistance of the connector from the supercap system, compares the contact resistance of the connector and a preset threshold resistance range, generates a control signal according to the comparison result, and provides the generated control signal to the supercap changing station.

The supercap system may include: a vehicle mounting part that, when the vehicle arrives at the supercap changing station when the supercap system is to be changed, allows a vehicle body to be mounted on a vehicle body coupling part; and a coupling state detection connector that measures and provides the contact resistance when coupled to the supercap system of the vehicle.

When the contact resistance of the coupling state detection connector is within the preset threshold resistance range, the vehicle may generate a first control signal for instructing the coupling of the vehicle and the supercap system and provide the generated first control signal to the supercap changing station.

When the contact resistance of the coupling state detection connector is not within the preset threshold resistance range after the vehicle is released, the vehicle may generate a second control signal for instructing the supercap changing station to disconnect the vehicle and the supercap changing system and provide the generated second control signal to the supercap changing station.

DETAILED DESCRIPTION OF EXEMPLARY EMBODIMENTS

Figure 1:
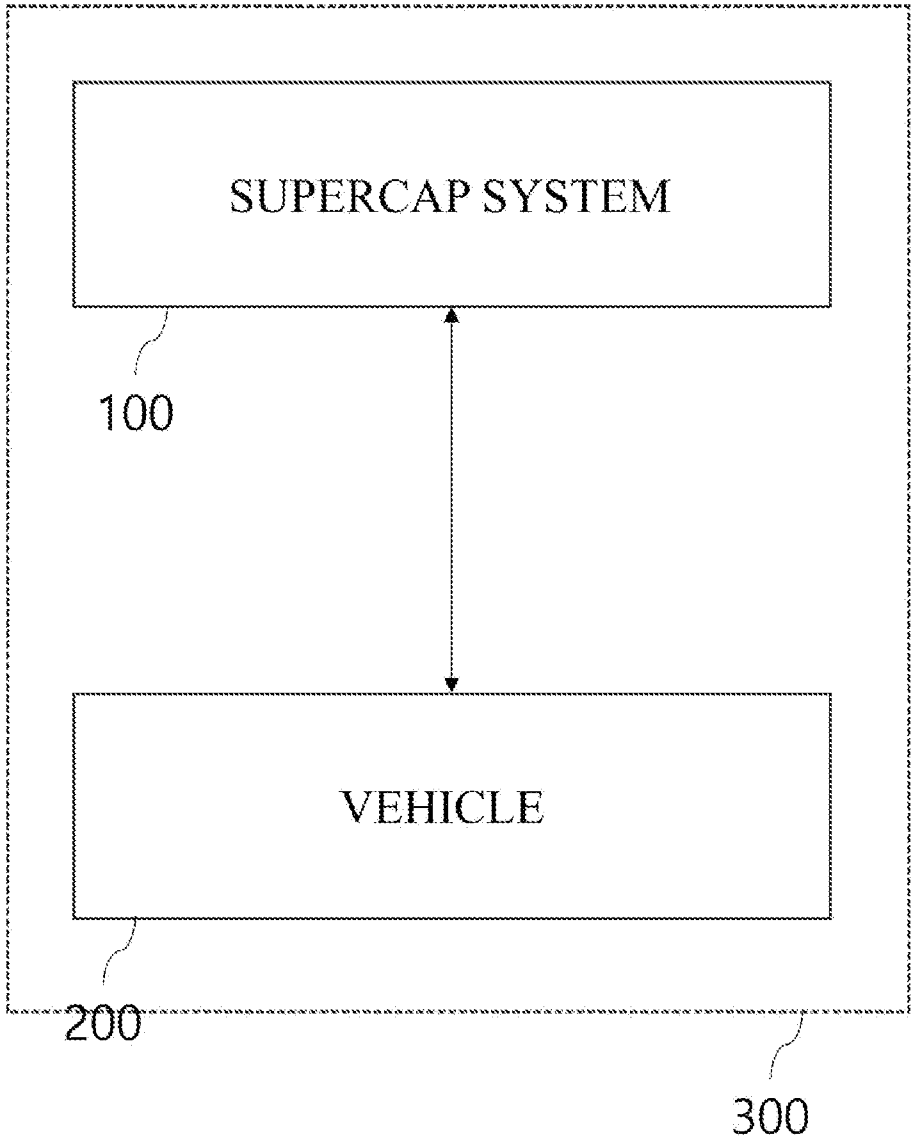
FIG. 1 is a diagram for describing a super capacitor changing system for a vehicle according to an embodiment of the present invention.

The above-described objects, features, and advantages will be described below in detail with reference to the accompanying drawings, and accordingly, those skilled in the art to which the present invention pertains will be able to easily implement the technical idea of the present invention. When it is decided that the detailed description of the known art related to the present invention may unnecessarily obscure the gist of the present invention, such detailed description will be omitted. Hereinafter, exemplary embodiments of the present disclosure will be described in detail with reference to the accompanying drawings. In the drawings, the same reference numerals are used to indicate the same or similar components.

Figure 2:
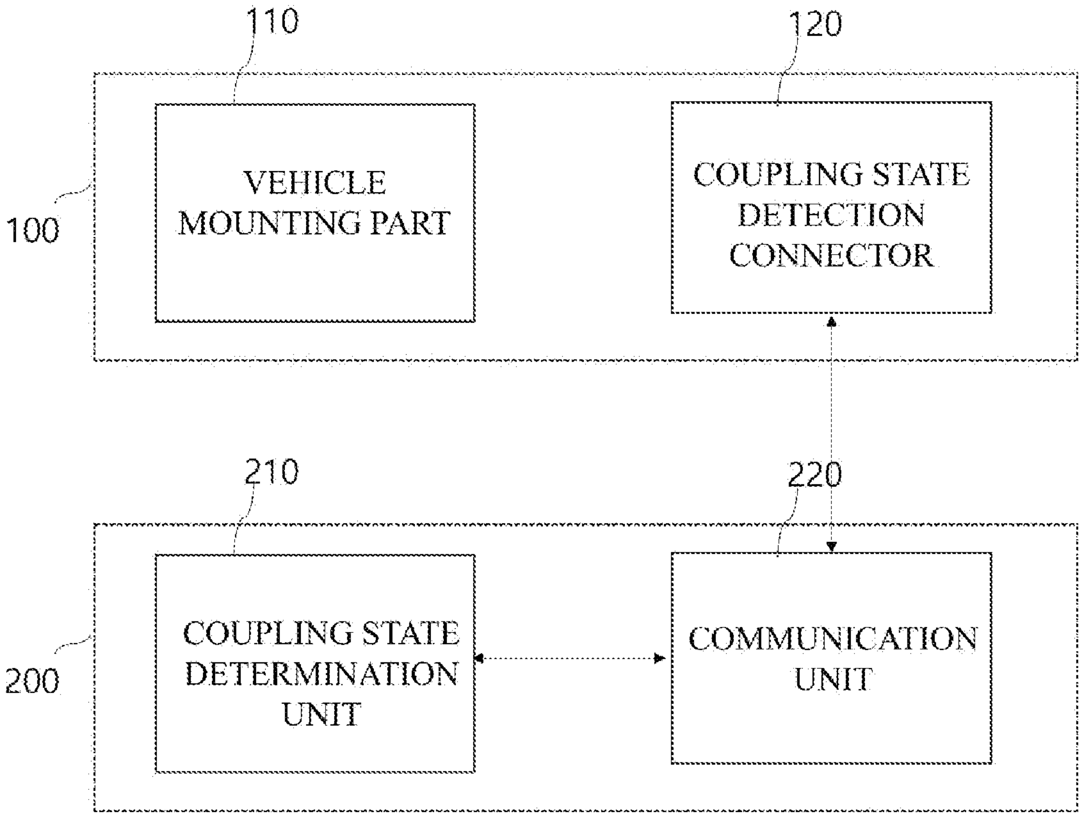
FIG. 2 is a diagram for describing an internal structure of the super capacitor changing system for a vehicle according to the embodiment of the present invention.

FIG. 1 is a diagram for describing a super capacitor changing system for a vehicle according to an embodiment of the present invention. FIG. 2 is a diagram for describing an internal structure of the super capacitor changing system for a vehicle according to the embodiment of the present invention.

Referring to FIGS. 1 and 2, the super capacitor changing system for a vehicle includes a supercap system 100, a vehicle 200, and a supercap changing station 300.

When a vehicle arrives at a supercap changing station 300 for changing a supercap system, a supercap system 100 is coupled to the vehicle and provides a contact resistance of the coupling state detection connector when a coupling state detection connector is fastened. The supercap system 100 includes a vehicle mounting part 110 and a coupling state detection connector 120.

The vehicle mounting part 110 allows a vehicle body to be mounted on the vehicle body coupling part when the vehicle arrives at the supercap changing station when the supercap system is to be changed.

When coupled to the supercap system of the vehicle, the coupling state detection connector 120 measures the contact resistance and provides the contact resistance to the vehicle 200. In this case, the contact resistance measured by the coupling state detection connector 120 is used to determine whether the supercap changing system is coupled normally.

When the vehicle 200 receives the contact resistance of the coupling state detection connector from the supercap system 100, the vehicle 200 compares the contact resistance of the connector and a preset threshold resistance range, and generates a control signal according to the comparison result and provides the generated control signal to the supercap changing station 300. The vehicle 200 includes a coupling state determination unit 210 and a communication unit 220.

When the coupling state determination unit 210 receives the contact resistance of the coupling state detection connector 120 from the supercap system 100 through the communication unit 220, the coupling state determination unit 210 determines whether the contact resistance of the coupling state detection connector 120 is within the preset threshold resistance range.

In an embodiment, the coupling state determination unit 210 provides a first control signal to the supercap changing station 300 when the contact resistance of the coupling state detection connector 120 is within the preset threshold resistance range. The first control signal may be a command instructing the coupling of the supercap system 100. Accordingly, the supercap changing station 300 may couple the supercap system 100 based on the first control signal.

In another embodiment, the coupling state determination unit 210 does not provide the first control signal to the supercap changing station 300 when the contact resistance of the coupling state detection connector 120 is not within the preset threshold resistance range.

Meanwhile, when receiving the contact resistance from the coupling state detection connector 120, the coupling state determination unit 210 displays the contact resistance in a first graph. In this case, the shape displayed in the first graph is different according to whether the coupling state detection connector 120 is coupled normally. In this case, the first graph continuously displays the contact resistances received from the coupling state detection connector 120.

The coupling state determination unit 210 divides the first graph into specific units and then groups the first graph to generate a plurality of groups.

In an embodiment, the coupling state determination unit 210 divides the first graph into specific units and then groups the first graph to generate the plurality of groups.

In another embodiment, the coupling state determination unit 210 analyzes the first graph, and when a waveform exists, divides and groups the first graph into cycle units to generate the plurality of groups.

Thereafter, the coupling state determination unit 210 compresses the contact resistance of the corresponding group for each of the plurality of groups.

In an embodiment, the coupling state determination unit 210 divides the first graph into specific units and then groups the first graph to generate the plurality of groups, and averages the contact resistance of the corresponding group for each of the plurality of groups to calculate the average value.

In this case, the coupling state determination unit 210 may divide the contact resistance in the first graph by a specific number unit to generate the plurality of groups.

Thereafter, the coupling state determination unit 210 compresses the contact resistance of each of the plurality of groups and displays the compressed contact resistance in a second graph, and then generates the first control signal according to the specific contact resistance in the second graph corresponding to each group and provides the generated first control signal to the supercap changing station 300.

In an embodiment, the coupling state determination unit 210 averages the contact resistance of each of the plurality of groups and displays the calculated average value in the second graph at a location corresponding to the group. In this case, the second graph averages a specific number of contact resistances in the corresponding group for each group and then displays the contact resistance corresponding to the average value.

As described above, the coupling state determination unit 210 averages the contact resistance of the corresponding group for each of the plurality of groups and displays the averaged contact resistance in the second graph, analyzes the second graph to extract the largest slope value, and then generates the first control signal based on the extracted largest slope value and provides the generated first control signal to the supercap changing station 300.

In an embodiment, the coupling state determination unit 210 compares the slope values extracted from each group to calculate a slope difference value, merges the groups according to the slope difference value to extract only one slope value, and then generates the first control signal based on the extracted one slope value and provides the generated first control signal to the supercap changing station 300.

In the above embodiment, the coupling state determination unit 210 compares the slope values extracted from each of the first group and the second group to calculate the slope difference value, and when the slope difference value is less than or equal to a specific value, the coupling state determination unit 210 merges the first group and the second group, and then generates the first control signal based on the larger slope value of the largest slope value extracted from the first group and the largest slope value extracted from the second group and provides the generated first control signal to the supercap changing station 300.

In the process of repeatedly executing the above process, when the number of merged groups is greater than or equal to the specific number, the merging is stopped. Therefore, the coupling state determination unit 210 checks the number of currently merged groups before merging the first group and the second group, and when the number of merged groups is greater than or equal to the specific number, the coupling state determination unit 210 does not perform the merging, but performs the merging when the number of merged groups is less than or equal to the specific number.

The supercap changing station 300 physically fixes or disconnects the vehicle 200 and the supercap changing station 300 according to the control signal received from the vehicle 200.

Figure 3:
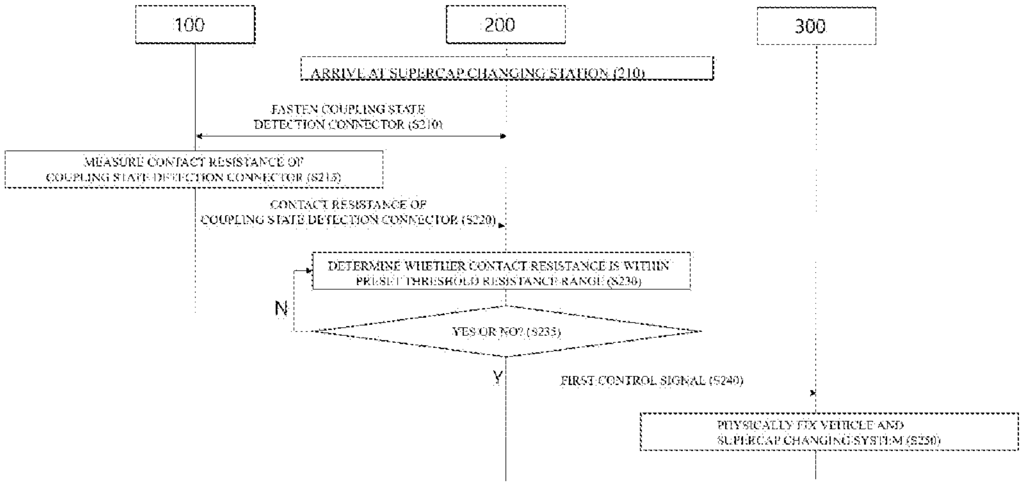
FIG. 3 is a flowchart for describing a method of changing a super capacitor for a vehicle according to an embodiment of the present invention.

FIG. 3 is a flowchart for describing a method of changing a super capacitor for a vehicle according to an embodiment of the present invention.

Referring to FIG. 3, the vehicle 200 arrives at the supercap changing station 300 when the supercap system 100 is to be changed (operation S200).

The vehicle mounting part of the supercap system 100 is coupled to the vehicle 200 and the coupling state detection connector is fastened (operation S210).

The supercap system 100 measures the contact resistance of the coupling state detection connector (operation S215) and provides the measured contact resistance to the vehicle 200 (operation S220).

When receiving the contact resistance of the coupling state detection connector from the supercap system 100, the vehicle 200 determines whether the contact resistance of the coupling state detection connector is within the preset threshold resistance range (operation S230).

When the contact resistance is within the preset threshold resistance range (operation S235), the vehicle 200 provides the first control signal to the supercap changing station 300 (operation S240). The first control signal may be a command instructing the coupling of the supercap system 100.

The supercap changing station 300 physically fixes the vehicle 200 and the supercap changing station 300 according to the first control signal (operation S250).

Figure 4:
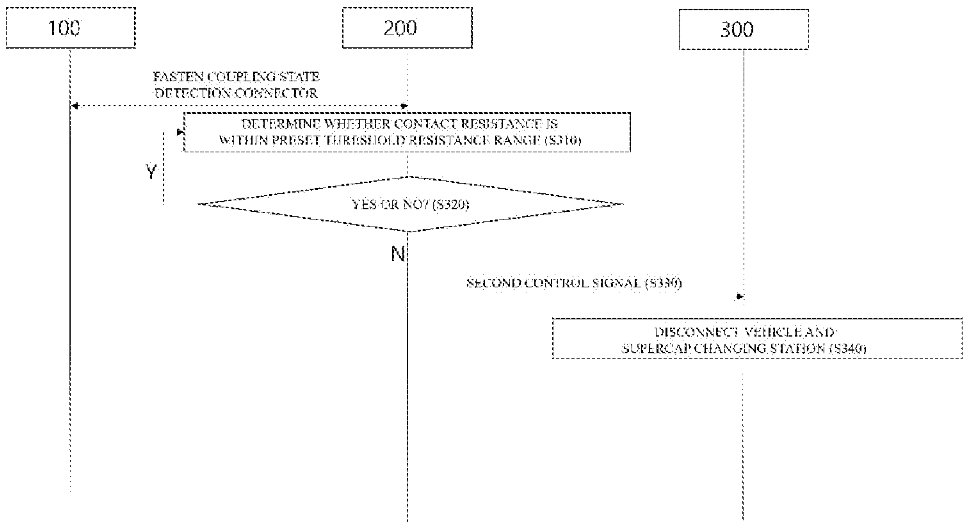
FIG. 4 is a flowchart for describing a method of changing a super capacitor for a vehicle according to another embodiment of the present invention.

FIG. 4 is a flowchart for describing a method of changing a super capacitor for a vehicle according to another embodiment of the present invention.

Referring to FIG. 4, after the vehicle 200 is released, it is determined whether the contact resistance of the coupling state detection connector is within the preset critical resistance range (operation S310). When the contact resistance of the coupling state detection connector is not within the preset threshold resistance range (operation S320), the vehicle 200 provides a second control signal to the supercap changing station 300 (operation S330). The second control signal may be a command instructing the disconnection of the supercap system 100.

When receiving the second control signal from the vehicle 200, the supercap changing station 300 disconnects the vehicle 200 and the supercap changing station 300 (operation S340).

Figure 5:
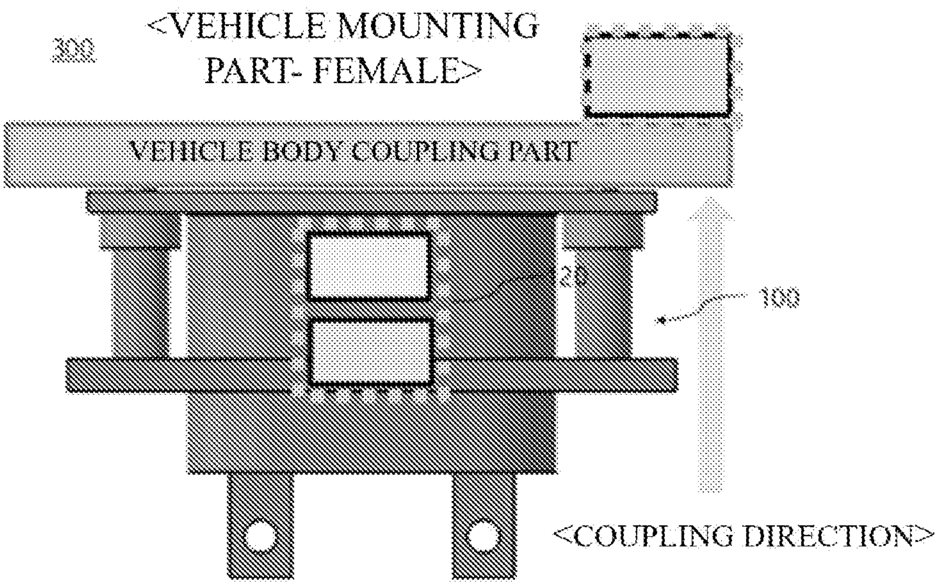
FIG. 5 is an exemplary diagram for describing a process of changing the super capacitor changing system for a vehicle according to the embodiment of the present invention.

FIG. 5 is an exemplary diagram for describing a process of changing the super capacitor changing system for a vehicle according to the embodiment of the present invention.

Referring to FIG. 5, when the vehicle 200 arrives at the supercap changing station when the supercap system is to be changed, the vehicle mounting part of the supercap system is coupled to the vehicle and the coupling state detection connector is fastened.

The supercap system 100 measures the contact resistance of the coupling state detection connector 120 and provides the measured contact resistance to the vehicle.

When receiving the contact resistance of the coupling state detection connector from the supercap system, the vehicle 200 compares the contact resistance of the coupling state detection connector with the preset threshold resistance range.

In an embodiment, when the contact resistance of the coupling state detection connector 120 is within the preset threshold resistance range, the vehicle 200 provides the first control signal to the supercap changing station 300. The first control signal may be a command instructing the coupling of the supercap system 100. Accordingly, the supercap changing station 300 may couple the supercap system 100 based on the first control signal.

In another embodiment, when the contact resistance of the coupling state detection connector 120 is not within the preset threshold resistance range, the vehicle 200 provides the first control signal to the supercap changing station 300.

Meanwhile, when receiving the contact resistance from the coupling state detection connector 120, the vehicle 200 displays the contact resistance in the first graph. In this case, the shape displayed in the first graph is different according to whether the coupling state detection connector 120 is coupled normally. In this case, the first graph continuously displays the contact resistances received from the coupling state detection connector 120.

The vehicle 200 divides the first graph into specific units and then groups the first graph to generate the plurality of groups.

In an embodiment, the vehicle 200 divides the first graph into specific units and then groups the first graph to generate the plurality of groups.

In another embodiment, the vehicle 200 analyzes the first graph, and when a waveform exists, divides and groups the first graph into cycle units to generate the plurality of groups.

Thereafter, the vehicle 200 compresses the contact resistance of the corresponding group for each of the plurality of groups.

In an embodiment, the vehicle 200 divides the first graph into specific units and then groups the first graph to generate the plurality of groups, and averages the contact resistance of the corresponding group for each of the plurality of groups to calculate the average value.

In this case, the vehicle 200 may divide the contact resistance in the first graph into specific number units to generate the plurality of groups.

Thereafter, the vehicle 200 compresses the contact resistance of each of the plurality of groups and displays the compressed contact resistance in the second graph, and then generates the first control signal according to the specific contact resistance in the second graph corresponding to each group and provides the generated first control signal to the supercap changing station 300.

In an embodiment, the vehicle 200 averages the contact resistance of each of the plurality of groups and displays the calculated average value in the second graph at a location corresponding to the group. In this case, the second graph averages a specific number of contact resistances in the corresponding group for each group and then displays the contact resistance corresponding to the average value.

As described above, the vehicle 200 averages the contact resistance of the corresponding group for each of the plurality of groups and displays the averaged contact resistance in the second graph, analyzes the second graph to extract the largest slope value, and then generates the first control signal based on the extracted largest slope value and provides the generated first control signal to the supercap changing station 300.

In an embodiment, the vehicle 200 compares the slope values extracted from each group to calculate a slope difference value, merges the groups according to the slope difference value to extract only one slope value, and then generates the first control signal based on the extracted one slope value and provides the generated first control signal to the supercap changing station 300.

In the above embodiment, the vehicle 200 compares the slope values extracted from each of the first group and the second group to calculate the slope difference value, and when the slope difference value is less than or equal to a specific value, the vehicle 200 merges the first group and the second group, and then generates the first control signal based on the larger slope value of the largest slope value extracted from the first group and the largest slope value extracted from the second group and provides the generated first control signal to the supercap changing station 300.

In the process of repeatedly executing the above process, when the number of merged groups is greater than or equal to the specific number, the merging is stopped. Therefore, the coupling state determination unit 210 checks the number of currently merged groups before merging the first group and the second group, and when the number of merged groups is greater than or equal to the specific number, the coupling state determination unit 210 does not perform the merging, but performs the merging when the number of merged groups is less than or equal to the specific number.

The vehicle 200 generates the control signal according to the comparison result and provides the generated control signal to the supercap changing station 300.

The supercap changing station 300 couples the vehicle and the supercap system according to the control signal.

As described above, according to the present invention, it is possible to prevent the occurrence of problems such as poor contact, communication errors, and the like due to poor fastening of a coupling state detection connector when changing a supercap system.

In addition, according to the present invention, it is possible to check and manage a fastening state of a coupling state detection connector applied to a changeable supercap system to detect and check whether the coupling state detection connector is fastened when a changing operation is performed, which allows the supercap system to be assembled normally in a vehicle.

Although the present invention has been described with reference to the limited embodiments and the accompanying drawings, it is not limited to the above-described embodiments but may be variously modified and changed from the above description by those skilled in the art to which the present invention pertains. Therefore, the scope and spirit of the present invention should be understood only from the following claims, and all of the equivalences and equivalent modifications to the claims are intended to fall within the scope and spirit of the present invention.

What is claimed is:

1. A method of changing a super capacitor for a vehicle, comprising:

when the vehicle arrives at a supercap changing station when a supercap system is to be changed, coupling a vehicle mounting part of the supercap system to the vehicle and fastening a coupling state detection connector;

measuring, by the supercap system, a contact resistance of the coupling state detection connector and providing the measured contact resistance to the vehicle;

when the vehicle receives the contact resistance of the coupling state detection connector from the supercap system, comparing the contact resistance of the coupling state detection connector with a preset threshold resistance range;

generating, by the vehicle, a control signal according to the comparison result and providing the generated control signal to the supercap changing station; and coupling, by the supercap changing station, the vehicle and the supercap system according to the control signal.

2. The method of claim 1, wherein the generating, by the vehicle, of the control signal according to the comparison result and providing the generated control signal to the supercap changing includes generating a first control signal for instructing the coupling of the vehicle and the supercap system when the contact resistance of the coupling state detection connector is within a preset threshold resistance range.

3. The method of claim 1, further comprising, when the contact resistance of the coupling state detection connector is not within the preset threshold resistance range after the vehicle is released, generating a second control signal for instructing the supercap changing station to disconnect the vehicle and the supercap changing system and providing the generated second control signal to the supercap changing station.

4. A super capacitor changing system for a vehicle, comprising:

a supercap system that, when the vehicle arrives at a supercap changing station when a supercap system is to be changed, is coupled to the vehicle and provides a contact resistance of the coupling state detection connector when a coupling state detection connector is fastened;

a supercap changing station that couples the vehicle and the supercap system upon receiving a control signal; and a vehicle that, when receiving the contact resistance of the connector from the supercap system, compares the contact resistance of the connector and a preset threshold resistance range, generates a control signal according to the comparison result, and provides the generated control signal to the supercap changing station.

5. The super capacitor changing system of claim 4, wherein the supercap system includes:

a vehicle mounting part that, when the vehicle arrives at the supercap changing station when the supercap system is to be changed, allows a vehicle body to be mounted on a vehicle body coupling part; and a coupling state detection connector that measures and provides the contact resistance when coupled to the supercap system of the vehicle.

6. The super capacitor changing system of claim 4, wherein, when the contact resistance of the coupling state detection connector is within the preset threshold resistance range, the vehicle generates a first control signal for instructing the coupling of the vehicle and the supercap system and provides the generated first control signal to the supercap changing station.

7. The super capacitor changing system of claim 4, wherein, when the contact resistance of the coupling state detection connector is not within the preset threshold resistance range after the vehicle is released, the vehicle generates a second control signal for instructing the supercap changing station to disconnect the vehicle and the supercap changing system and provides the generated second control signal to the supercap changing station.

* * * * *